April 28, 1931.    M. LEVINE    1,802,726
METHOD OF CLEANING TRICKLING FILTERS USED IN PURIFYING
INDUSTRIAL WASTES AND OTHER SEWAGES
Filed Oct. 28, 1929

Inventor
Max Levine
By M. Talbert Dick
Attorney

Patented Apr. 28, 1931

1,802,726

UNITED STATES PATENT OFFICE

MAX LEVINE, OF AMES, IOWA, ASSIGNOR TO IOWA STATE COLLEGE OF AGRICULTURAL AND MECHANICAL ARTS, OF AMES, IOWA, A CORPORATION OF IOWA

METHOD OF CLEANING TRICKLING FILTERS USED IN PURIFYING INDUSTRIAL WASTES AND OTHER SEWAGES

Application filed October 28, 1929. Serial No. 402,947.

The principal object of this invention is to provide a more efficient method of purifying industrial wastes and like sewages.

More specifically the object of my invention is to provide an improved method of removing substances which are responsible for clogging biological trickling or percolating filters.

A further object of this invention is to permit the use of very fine filtering material.

A still further object of my invention is to provide a method of and means for cleaning trickling filters and the like that is economical in manufacture and use.

These and other objects will be apparent to those skilled in the art.

My invention consists in the method hereinafter set forth, pointed out in my claim and illustrated in the accompanying drawing in which:

In the treatment of sewage, a gelatinous film consisting of biological growths and suspended materials collects on the surface eventually clogging the filter and thereby reducing its efficiency. Such clogging takes place more rapidly on filters of fine material than on those of coarse material. The practice of engineers has been to favor the coarser materials in order to reduce clogging difficulties, although it has been recognized that the finer materials are more efficient purifying agents. The elimination or reduction of clogging would make it possible to employ finer filling materials in trickling filters and thereby increase the efficiency and economy of the method of sewage purification.

My extensive experiments on trickling filters have demonstrated conclusively that it is possible to remove the clogging materials from the upper layers of trickling filters, without appreciably reducing the biological purification of such filters.

Figure 1:
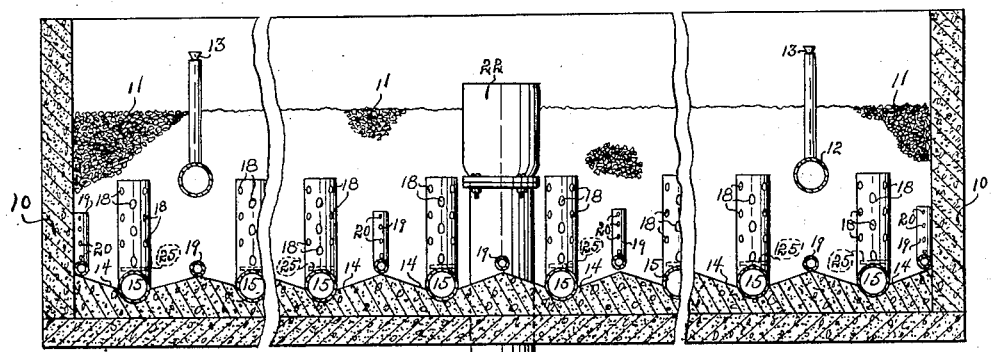
Fig. 1, is a side sectional view of my invention ready for use.

The numeral 10 designates the usual shallow filter tank open at its top and partly filled with very fine cinders or rock 11. Suitably mounted in the tank 10 are the pipes 12 leading from the fluid or liquid to be treated. Communicating with the pipes 12 are the usual spray nozzles 13 terminating above the surface of the cinders or rock 11. In the bottom of the tank 10 are a plurality of troughs 14 having their sides extending inwardly and downwardly as shown in Fig. 1. By this arrangement all purified liquid collecting in the bottom of the tank will come to rest in the troughs. In the bottom of each trough is an outlet pipe 15 having a plurality of small holes 16, through which the filtered or purified liquid passes. Each of the pipes 15 communicates with a common pipe 17 designed to lead to any desirable point where the filtered liquid is needed.

These pipes 15 have their free ends extending upwardly along the side of the tank as shown in Fig. 1, the purpose for which will hereinafter be appreciated. The numeral 18 designates holes in the vertical portions of each of the pipes 15. In between each of the pipes 15 and at the upper marginal edge of each of the troughs is an air or gas inlet pipe 19 having a plurality of holes 20. These air pipes each communicate with a common pipe 21 and have their free ends extending up along one side of the tank 10 as shown in Fig. 1.

Terminating in the tank and above the granular material 11 is an overflow trough 22 leading to a point outside of the filter or to a settling tank. Designed to be operatively connected to a prime mover not shown and communicating with the inside of the pipe 21 is an air fan 23.

Figure 2:
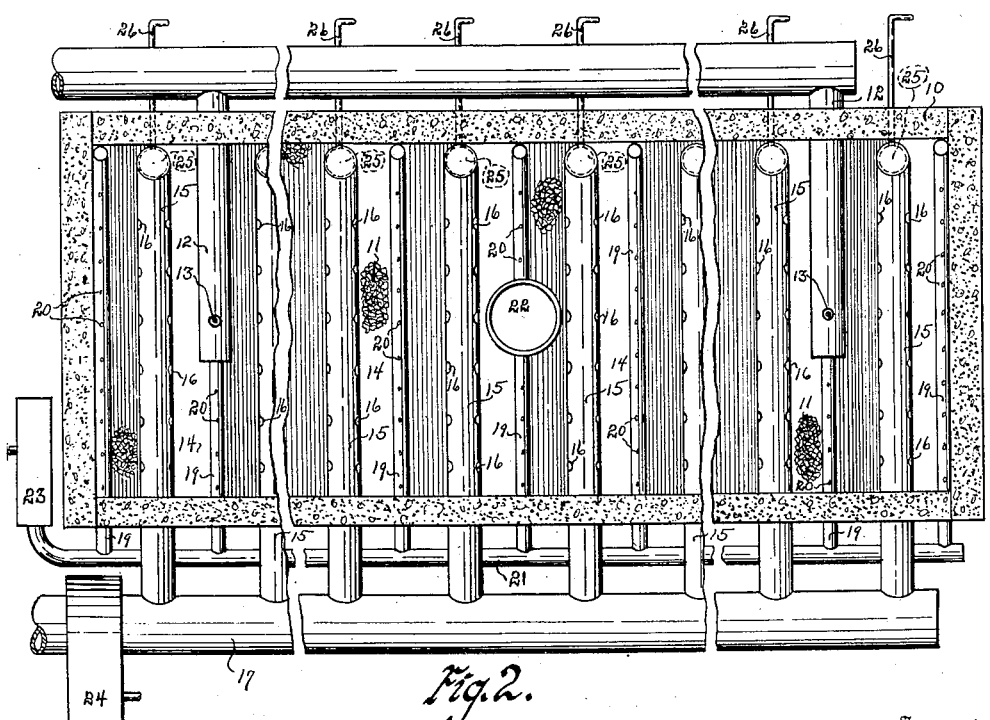
Fig. 2, is a top plan view of the complete invention and more fully illustrates its construction.

The numeral 24 designates a turbine type of pump in the pipe 17 designed to be in operative engagement with a prime mover not shown. In each of the vertical portions of the pipes 15 and below the holes 18 is a butterfly valve 25 manually operated by a handle member 26 extending to a point outside of the tank 10 as shown in Fig. 2.

The method of washing the filter consists of first placing the butterfly valves in an open position and then flooding the filter tank with water or the treated sewage to a depth of a few inches above the granular filter material 11. This may easily be accomplished by so rotating the turbine pump 24 that the water or treated sewage will be forced through the pipe 17, into the pipes 15 and thence through the holes 16 and 18 back into the filter tank. Next the air fan 23 is started and air under pressure is forced into the pipes 19 and through the holes 20 into the tank and filter material. This causes a very effective agitation and at once brings much of the clogging materials into suspension.

As soon as the clogging materials are dislodged the air agitation is reduced or completely stopped and the speed of the pump 24 so regulated as to admit water or treated sewage at a rate which will keep the disengaged clogging materials in suspension, but which will not carry away any of the filtering material.

The water or treated sewage will act as a vehicle to the clogging material and will overflow into the trough 22 and carry with it the undesirable material. After the washing is complete the pump 24 and fan 23 are stopped and the filter permitted to drain slowly. It will readily be seen that by such a method filters of this nature may be cleaned easily, quickly and economically and that the air and liquid attack the granular material not only from points in the bottom of the tank but from points at the side of the tank through the holes 18. By the pipes 15 resting in the bottom of the troughs 14 the floor of the tank will also be washed of all undesirable foreign matter. When the device is again to be used as a trickling filter the butterfly valves in the vertical portions of the pipes 15 should be moved to a closed position in order that the liquid to be cleaned will have to pass completely through the granular material 11 to the holes 16 before it can pass out of the trickling filter through the pipes 15.

The "backwashing" phase of my invention should not be confused with the backwashing mechanical water filters.

In mechanical water filters the clogging material is inorganic, finely flocculent in nature, and consists of a layer super-imposed on a bed of fine sand with very little adhering to the sand. The clogging materials which need be removed from trickling filters are organic in nature, consisting primarily of living biological agents and their products, which are strongly adherent to the filling material, so as to constitute almost an integral part of the filling material.

I claim as my invention:

A method of removing clogging materials from biological filters consisting in introducing liquid under pressure into said filtering material, the reducing of the force with which said liquid is introduced, the introducing of air under pressure into said liquid and filtering material, the stopping of the injecting of air into said liquid and filtering material and then allowing said liquid holding said clogging materials in suspension to rise to a point above said filtering material and pass from said filter through a suitable trough located above the surface of said filtering material.

MAX LEVINE.